US009041667B2

(12) United States Patent
Chowdhury

(10) Patent No.: US 9,041,667 B2
(45) Date of Patent: May 26, 2015

(54) ELECTRONIC DEVICE AND METHOD OF CONTROL OF DISPLAYS

(75) Inventor: Margoob Chowdhury, Singapore (SG)

(73) Assignee: BlackBerry Limited, Waterloo (CA)

( * ) Notice: Subject to any disclaimer, the term of this patent is extended or adjusted under 35 U.S.C. 154(b) by 409 days.

(21) Appl. No.: 13/494,546

(22) Filed: Jun. 12, 2012

(65) Prior Publication Data

US 2013/0328793 A1    Dec. 12, 2013

(51) Int. Cl.
*G06F 3/041*    (2006.01)
*G09G 5/00*    (2006.01)

(52) U.S. Cl.
CPC    *G06F 3/041* (2013.01); *G09G 5/00* (2013.01); *G09G 2310/0232* (2013.01); *G09G 2330/022* (2013.01)

(58) Field of Classification Search
None
See application file for complete search history.

(56) References Cited

U.S. PATENT DOCUMENTS

| | | | |
|---|---|---|---|
| 2002/0175887 A1* | 11/2002 | Yamazaki | 345/87 |
| 2008/0001924 A1* | 1/2008 | de los Reyes et al. | 345/173 |
| 2010/0309147 A1* | 12/2010 | Fleizach et al. | 345/173 |
| 2011/0080348 A1 | 4/2011 | Lin et al. | |
| 2011/0242039 A1* | 10/2011 | Kalis et al. | 345/174 |
| 2011/0285642 A1* | 11/2011 | Lee et al. | 345/173 |
| 2013/0154990 A1* | 6/2013 | Hamada | 345/173 |
| 2013/0215040 A1* | 8/2013 | Bose et al. | 345/173 |
| 2013/0342474 A1* | 12/2013 | Sultenfuss et al. | 345/173 |

* cited by examiner

*Primary Examiner* — Joseph Haley
*Assistant Examiner* — Emily Frank
(74) *Attorney, Agent, or Firm* — Geoffrey deKleine; Borden Ladner Gervais LLP

(57) ABSTRACT

A method includes displaying information in a display area of a first display of an electronic device, detecting a low-power condition for the electronic device, in response to detecting the low-power condition, discontinuing displaying information in the display area of the first display, and displaying information on a second display, which information is visible through the non-display area of the first display.

21 Claims, 6 Drawing Sheets

ELECTRONIC DEVICE AND METHOD OF CONTROL OF DISPLAYS

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
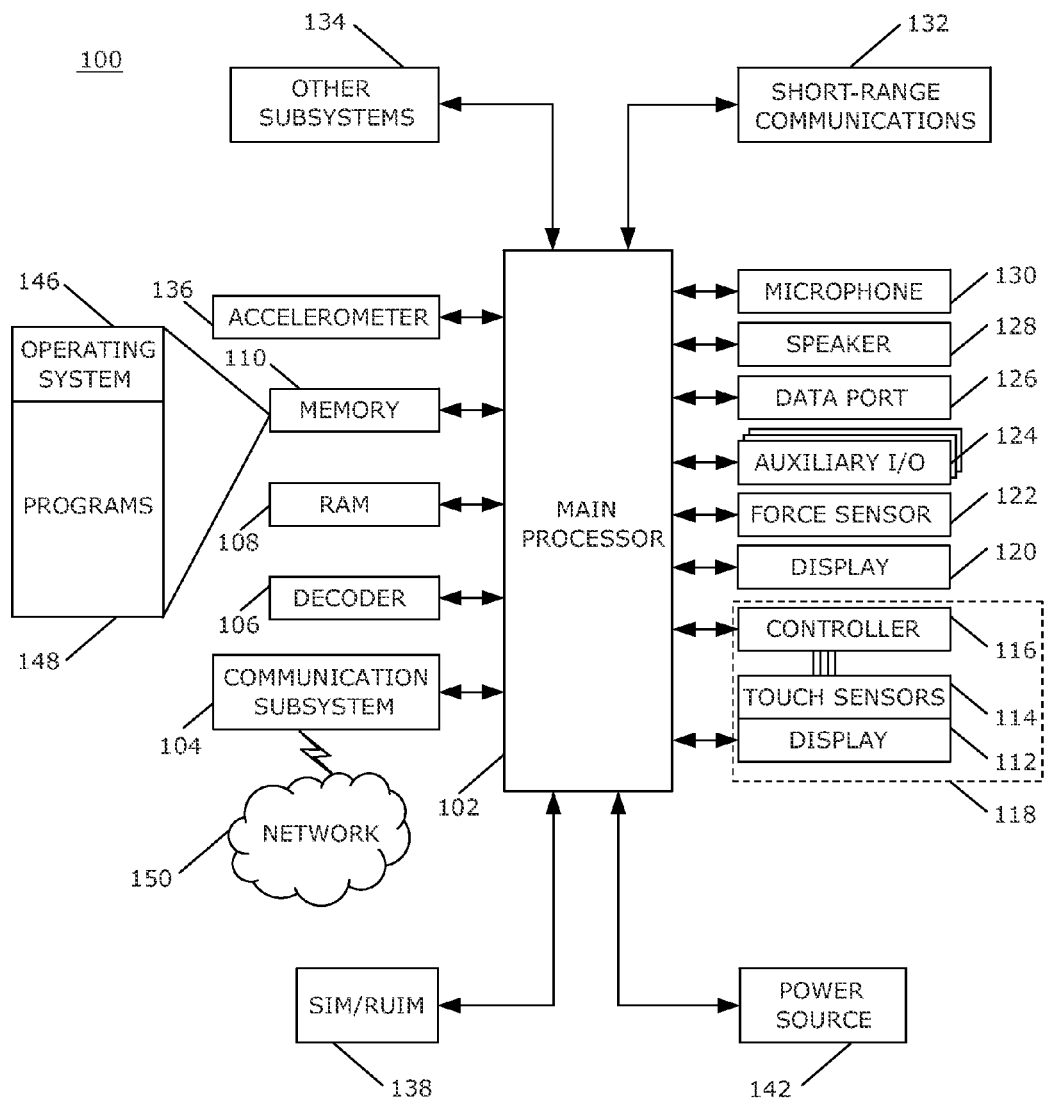
FIG. 1 is a block diagram of a portable electronic device in accordance with the disclosure.

The following describes an apparatus for and method of displaying information. The method includes displaying information in a display area of a first display of an electronic device, and detecting entry into a low-power condition of the electronic device. In response to detecting that the device is in a low-power condition, discontinuing displaying information in the display area of the first display, and displaying information on a second display, which information is visible through a non-display area of the first display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, an auxiliary display 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114 that may be part of or included with a protective cover. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus (active or passive), pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
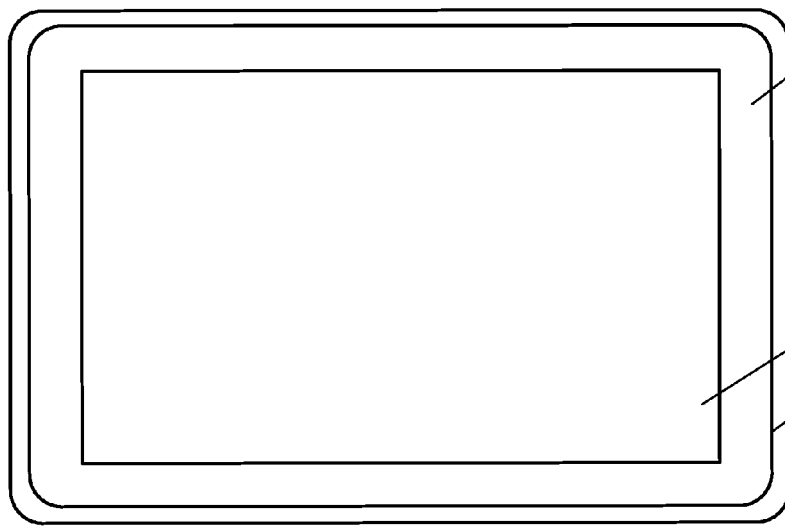
FIG. 2 is a front view of an electronic device in accordance with the disclosure.
Figure 3:
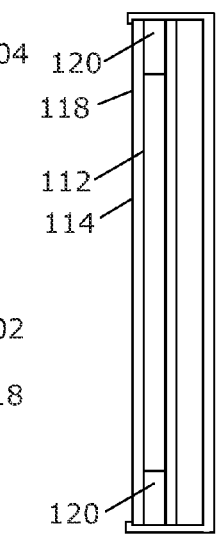
FIG. 3 and FIG. 4 are sectional views of the electronic device in accordance with the disclosure.
Figure 4:
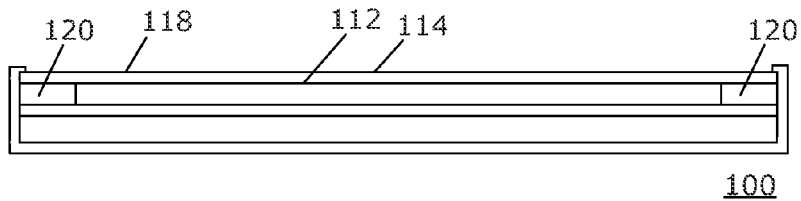

A front view of one example of an electronic device 100 is shown in FIG. 2, and sectional views of the electronic device are illustrated in FIG. 3 and FIG. 4. The touch-sensitive display 118 includes a display area 202 in which information may be displayed, and a non-display area 204 extending around the periphery of the display area 202. The display area 202 generally corresponds to the area of the display 112 of the touch-sensitive display 118, which is referred to as the primary or first display herein. Information is not displayed in the non-display area 204 by the display 112, which non-display area 204 may be utilized to accommodate, for example, electronic traces or electrical connections, adhesives or other sealants, and/or protective coatings around the edges of the display area. The non-display area 204 may be referred to as an inactive area of display 112, and is not part of the physical housing or frame of the electronic device 100. Typically, no pixels of the display 112 are in the non-display area 204, thus no image can be displayed by the display 112 in the non-display area 204. The auxiliary display 120, which is not part of the display 112, is disposed, for example, under a non-display area of the touch-sensitive display 118 such that information displayed by or on the auxiliary display 120 is visible through the non-display area 202. The touch sensors may be disposed in the non-display area 204, which touch sensors may be extended from the touch sensors 114 in the display area 202 or distinct or separate touch sensors from the touch sensors in the display area 202. A touch, including a gesture, may be associated with the display area 202, the non-display area 204, or both areas. The touch sensors may extend across substantially the entire non-display area or may be disposed in only part of the non-display area. Alternatively, the touch-sensors may be disposed in the display area 202 and not in the non-display area 204.

The auxiliary display 120 may be, for example, a light emitting diode (LED) display or organic light emitting diode (OLED) display. The auxiliary display 120 may be lower resolution than the display 112 and may be smaller in any dimension than the display 112. The auxiliary display 120 may utilize less power to display information than the display 112 and may be utilized to display information along one or more sides of the display area 202 of the touch-sensitive display 118. Alternatively, the auxiliary display 120 may comprise one or more separate display elements that are disposed along one or more sides of the display area 202 of the touch-sensitive display 118. For example, the auxiliary display may comprise one or more display elements disposed on each of 1, 2, 3, or 4 sides of a rectangular display area 202. The auxiliary display 120 may also be referred to as a secondary display. The auxiliary display 120 may extend partly along any side of the display area 202 or may extend along any entire side of the display area 202.

Information, such as text, characters, symbols, images, icons, and other items may be displayed on the auxiliary display 120 via the processor 102. For example, the information may be utilized to provide directions, suggestions, or guidelines for input, or to provide notifications, such as notifications or warnings including information from applications running the electronic device 100.

The auxiliary display 120 may display information when the portable electronic device 120 is in a low-power condition, also referred to as a reduced-power condition, or when the portable electronic device 120 is in a high or normal power condition. Notifications and/or directions for providing input to the electronic device 100 as well as other information may be displayed by the auxiliary display 120. The auxiliary display 120 may also display information based on the application running on the electronic device 100, including, for example, third party applications. The auxiliary display 120 and the information displayed by the auxiliary display 120 may be configurable and is controlled by the processor 102 to display any information. Information may also be displayed on the auxiliary display 120 during normal or other than low-power conditions.

Figure 5:
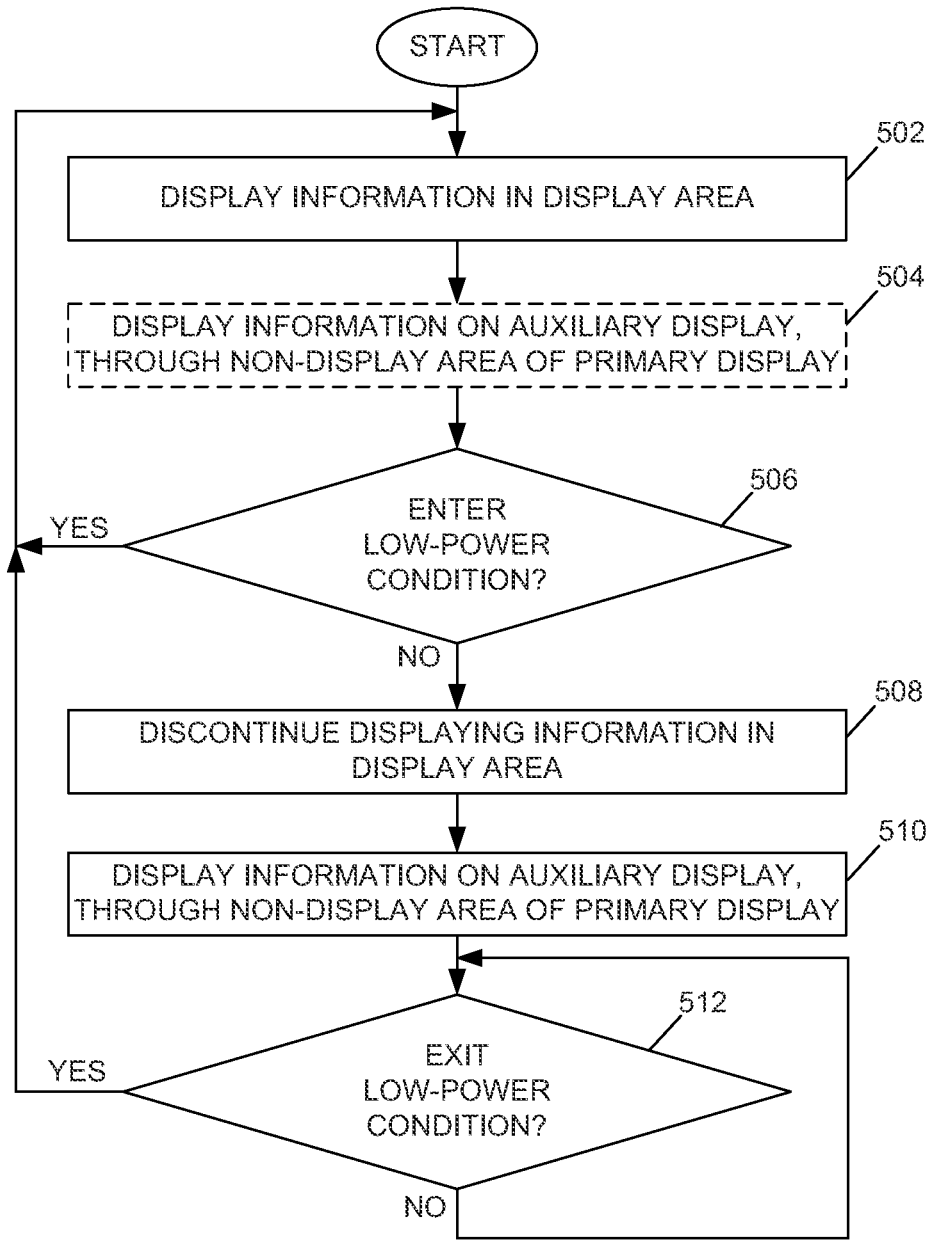
FIG. 5 is a flowchart illustrating a method of displaying information in accordance with the disclosure.

A flowchart illustrating a method of displaying information on an electronic device is shown in FIG. 5. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, such as a non-transitory computer-readable medium.

During normal operation of the portable electronic device 100, information is displayed 502 in the display area 202 of the touch-sensitive display 118. The information may be any suitable information and may be associated with a software program or application running on the electronic device 100.

Optionally, information may be displayed 504 on the auxiliary display 120, which information is visible through the non-display area 204 of the touch-sensitive display 118. The information may include any suitable information that may be associated with the information displayed on the touch-sensitive display 118, or may be associated with a software program or application that is not associated with the information displayed on the touch-sensitive display 118. The information may include a notification or notifications, directions for input, an illustration of a gesture, symbols, and so forth.

In response to detecting entry 506 into a low-power condition, for example, when an indication to enter the low power condition is received from the processor 102, the process continues at 508. The indication may be a command received from the processor. The low-power condition, which may be referred to as a "sleep" condition or state, is a condition in which no information is displayed on the touch-sensitive display. During a low-power condition, the electronic device 100 may discontinue processes or operate processes at a slower speed and one or more hardware components may be powered-down or operated at a slower speed to conserve power or provide other advantages. The electronic device 100 may operate in the low-power condition when the processor 102 determines that no touch is detected on the touch-sensitive display 118 for a period of time that meets a threshold, when no input is generally detected by the electronic device 100, when the device is locked by selection of a button or receipt of a gesture on the touch-sensitive display 118, when the device is placed in a holster, when the device is covered by a cover, and so forth.

The display of information in the display area 202 of the touch-sensitive display 118 is discontinued 508 and power to the display 112 is reduced. Touch sensing utilizing the touch sensors 114 may continue. Optionally, the touch sensors 114 may be utilized to provide reduced-power touch sensing in the low-power condition. For example, scanning fewer touch sensors, utilizing fewer pulses of signal carried by drive electrodes or by increasing a sleep time between scans of the touch-sensitive display 118. Alternatively, the touch sensors 114 in the non-display area 204 may continue to be utilized to detect a touch while touch-sensors that are disposed only in the display area 202 are not utilized when in the low-power condition. Thus, touches in the non-display area 204 may be detected when the electronic device 100 is in the low-power condition.

Information is displayed 510 on the auxiliary display 120, which information is visible through the non-display area of the touch-sensitive display 118. The information may be information displayed before the indication to enter the low-power condition is received or new information may be displayed when the device enters the low-power condition. For example, a notification or notifications or symbols. Additionally, the information may include directions for input to exit the low-power condition.

When an indication to exit the low-power condition is received 512, the process continues at 502. The electronic device 100 may exit the low-power condition when the processor 102 determines that a touch is detected at a designated location or a particular gesture is received on the touch-sensitive display 118, when input is generally detected by the electronic device 100, when the device is removed from a holster, when a cover is removed, and so forth.

Figure 6:
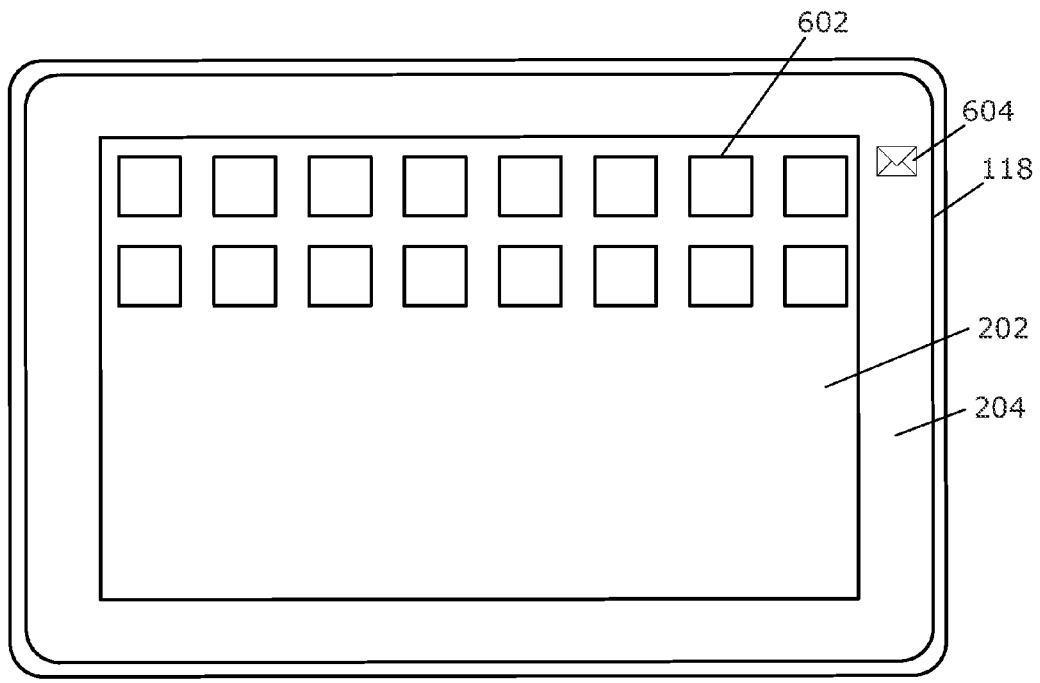
FIG. 6 through FIG. 10 are front views illustrating examples of information displayed in a non-display area.

Examples of information displayed through the non-display area 204 are illustrated in FIG. 6 through FIG. 10. In the example of FIG. 6, the information is shown displayed on the auxiliary display 120 in the non-display area 204 along one short side of the display area 202. The electronic device 100 is not in a low-power condition in FIG. 6, and information is displayed on the touch-sensitive display 118. The information may include, for example, selectable elements 602, such as icons. Information is also displayed on the auxiliary display 120. The information in this example is a notification 604 of received email. The notification is a symbol representing the received mail. The notification may also be displayed when the electronic device 100 is in the low-power condition, for example, to notify the user of receipt of new mail. A touch detected on or near the notification 604 on the auxiliary display may open up the new email by displaying the email in the display area 202. Alternatively, a touch detected on or near the notification 604 may cause further information to be displayed by the auxiliary display 120 and the electronic device 100 may remain in the low-power condition. For example, the number of new or unopened emails may be displayed in the non-display area 202 by displaying the information on the auxiliary display 120.

Figure 7:
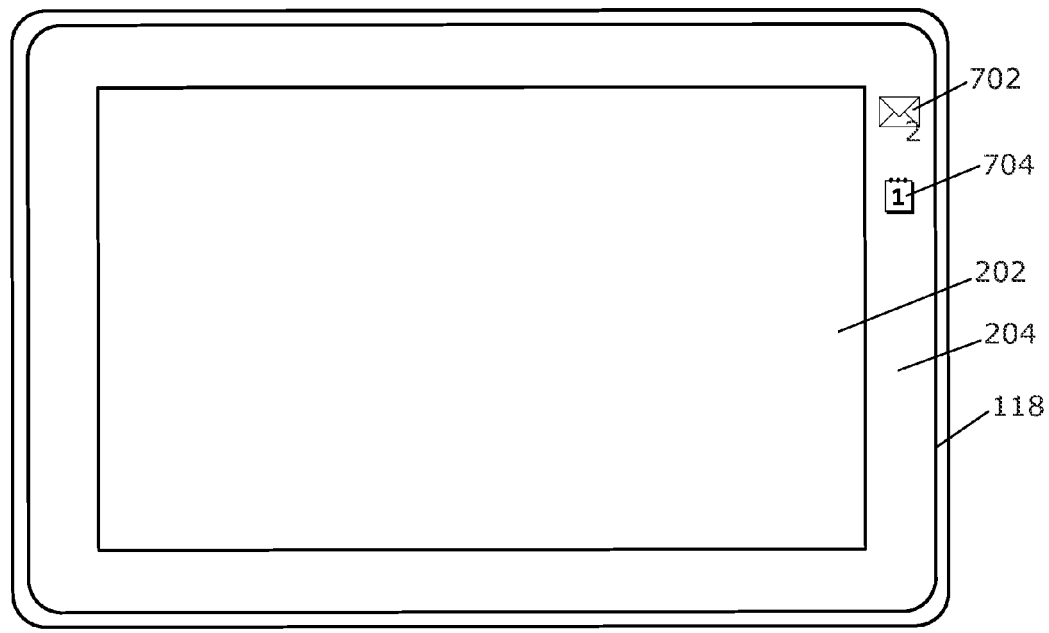

Other symbols may also be displayed in place of or in addition to the email symbol. For example, symbols may be displayed as a notification of a calendar event, such as a meeting or appointment, a task, an alarm, a received call, and so forth. In the example of FIG. 7, two symbols are displayed, including an email notification 702 of two new email messages received and a calendar notification 704 for an appointment. In this example, the information is displayed on the auxiliary display 120 when the electronic device 100 is in a low-power condition, and no information is displayed on the touch-sensitive display 118. This information may alternatively be displayed when the device 100 is not in a low-power condition.

Figure 8:
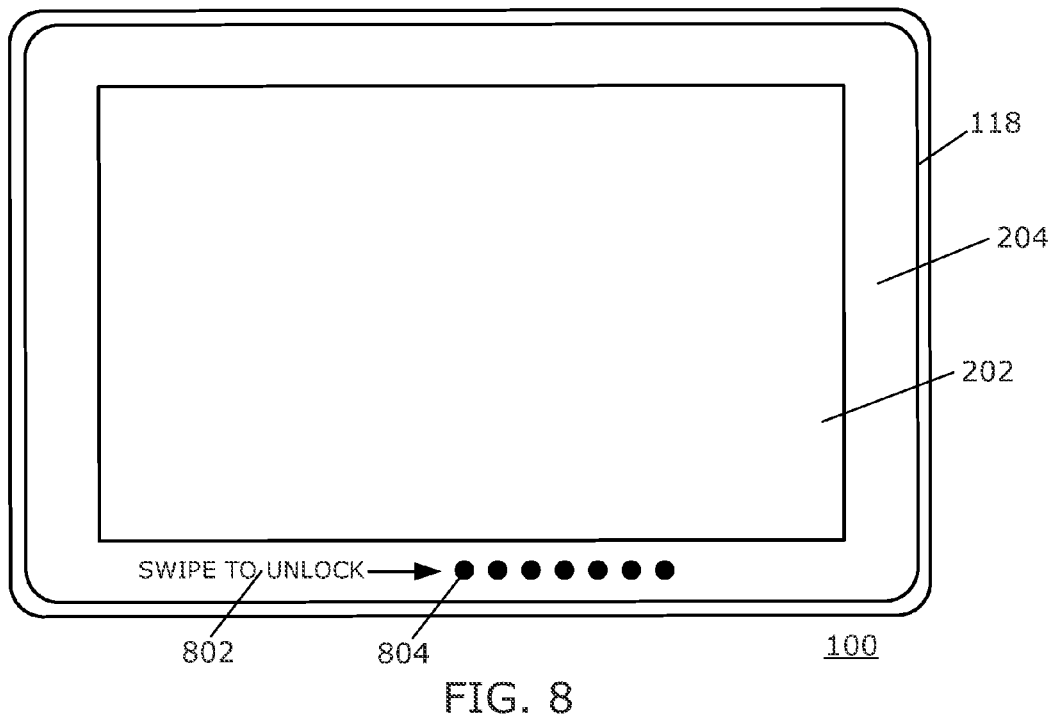

Another example of information displayed on the auxiliary display 120 is illustrated in FIG. 8. In this example, the information is displayed by the auxiliary display 120 through the non-display area 204, along a long side of the display area 202. The information includes directions 802 for input to exit the low-power condition. The information directs the user to swipe along the non-display area 204 to unlock the electronic device 100. To illustrate the swipe location and direction, the electronic device may illuminate areas of the auxiliary display 120. In this example, 7 LEDs 804, which are part of the auxiliary display 120, are illuminated in sequence to indicate the swipe direction. When a swipe is detected along the LEDs 804, the electronic device 100 exits the low-power condition. Alternatively, an arrow or arrows may be displayed to identify a swipe location and direction.

Alternatively, the information may direct the user to touch one or more locations on the touch-sensitive display 118. The directions may be displayed when the electronic device 100 is not in a low-power condition, for example, to identify a touch location or gesture to cause the electronic device to perform a function.

Figure 9:
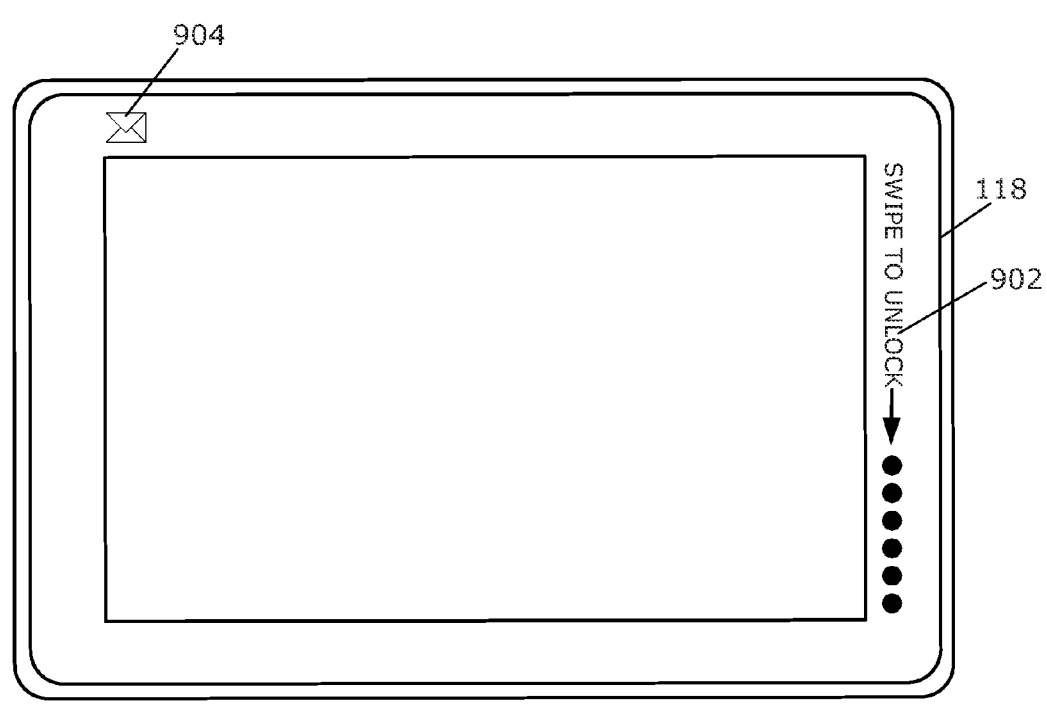

An example of information displayed on the auxiliary display 120 and an a further auxiliary display is illustrated in FIG. 9. In this example, the information is displayed on auxiliary displays elements along two sides of the display area 202. In this example, while the electronic device 100 is in a low-power condition, an email comes in. The information displayed on one element of the auxiliary display includes a notification 904 of the email visible through the non-display area 204 along a long side of the display area 204. In addition, information in the form of directions 902 for input to exit the low-power condition are displayed visible through the non-display area 204 along a short side of the display area 204. The information may alternatively be displayed visible through the non-display area 204 along a long side of the display area 204, such as shown in FIG. 8. Alternatively, the directions may be alternatively displayed along a short side and a long side or along 3 sides or 4 sides of the non-display area 204.

Figure 10:
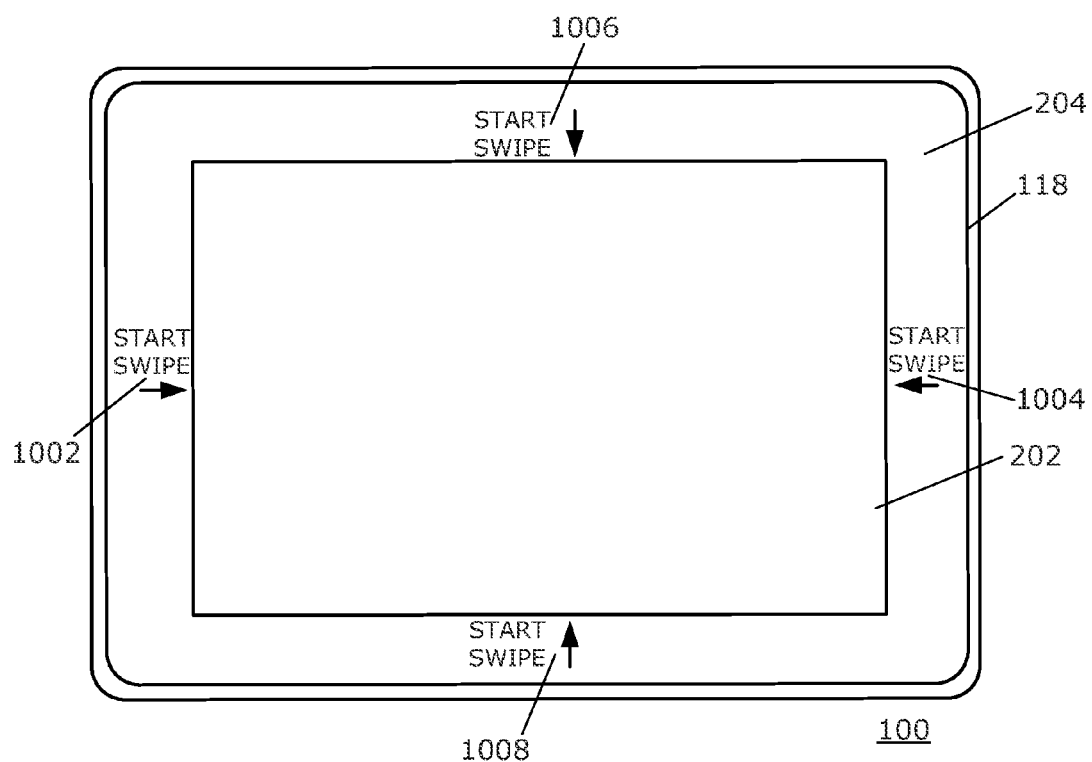

Another example of information displayed on the auxiliary display 120 is illustrated in FIG. 10. In this example, the touch sensors are not disposed on the non-display area 204. In this example, information is shown displayed on the auxiliary display 120 in the non-display area 204, along each side of the display area 202. The information may be displayed on all sides of the non-display area at the same time or alternating between the various sides. In this example, a gesture starting at any edge of the display, including in the non-display area 204 when touch sensors 114 are disposed in the non-display area 204, is an input to the device 100 indicating to unlock the device and exits low-power condition. Each of directions 1002, 1004, 1006, 1008 may be provided at the same time or in an alternating manner, where one of the directions 1002, 1004, 1006, 1008 is displayed at a given time. Alternatively, two of the directions 1002, 1004 may be displayed at one time, alternating with the other two directions, 1006, 1008 at another time.

In any of the examples herein, the information may be displayed on the auxiliary display 120 intermittently or periodically during low-power condition. Different information may be displayed in an alternating manner on the auxiliary display 120, e.g., two or more messages may be displayed at the same time, two or more messages may be displayed one at a time in alternating sequence, and so forth.

A method includes displaying information in a display area of a first display of an electronic device, detecting a low-power condition for the electronic device, in response to detecting the low-power condition, discontinuing displaying information in the display area of the first display, and displaying information on a second display, which information is visible through the non-display area of the first display.

An electronic device includes a first display comprising a display area to display information and a non-display area extending around the periphery of the display area, a second display disposed in the non-display area of the first display, and a processor coupled to the first display and the second display and configured to display information on the second display when the electronic device is in a low-power condition and information is not displayed on the first display.

Information may be displayed on the auxiliary display when the electronic device is in the low-power condition. Thus, information may be displayed without utilizing the display of the touch-sensitive display. Notifications and directions, for example, may be displayed when the display 112 is powered down, saving electronic device power while displaying information.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   displaying information at a first resolution in a display area of a first display of an electronic device;
   detecting entry into a low-power condition of the electronic device;
   in response to detecting the low-power condition:
   discontinuing displaying information in the display area of the first display; and
   displaying information at a second resolution on a second display, which information is visible through a non-display area of the first display,
   wherein the second resolution is lower than the first resolution.

2. The method according to claim 1, wherein displaying information on the second display comprises displaying a notification.

3. The method according to claim 1, wherein displaying information on the second display comprises displaying directions for input.

4. The method according to claim 1, wherein displaying information on the second display comprises illuminating areas of the second display in sequence to illustrate a gesture.

5. The method according to claim 1, wherein displaying information on the second display comprises displaying a symbol.

6. The method according to claim 1, wherein displaying information on the second display comprises displaying directions for input, the method comprising exiting the low-power condition when the input is detected.

7. The method according to claim 1, comprising exiting the low-power condition in response to detecting a touch associated with the information displayed on the second display.

8. The method according to claim 1, comprising:
   detecting touches utilizing touch sensors in the display area while displaying information in the display area;
   in response to detecting the low-power condition:
   discontinuing utilizing the touch sensors in the display area;
   utilizing touch sensors in the non-display area.

9. A non-transitory computer-readable storage medium having computer-readable code executable by at least one processor of the portable electronic device to:
   display information at a first resolution in a display area of a first display of an electronic device;
   detect entry into a low-power condition of the electronic device;
   in response to entering the low-power condition:
   discontinue displaying information in the display area of the first display; and display information at a second resolution on a second display, which information is visible through a non-display area of the first display, wherein the second resolution is lower than the first resolution.

10. An electronic device comprising:

a first display comprising a display area to display information and a non-display area extending around the periphery of the display area;

a second display disposed in the non-display area of the first display;

a processor coupled to the first display and the second display and configured to display information on the second display when the electronic device is in a low-power condition and information is not displayed on the first display, wherein the resolution of the second display is lower than the resolution of the first display.

11. The electronic device according to claim 10, wherein the second display comprises at least one of a light emitting diode display, and an organic light emitting diode display.

12. The electronic device according to claim 10, wherein the second display is disposed adjacent one side of the first display.

13. The electronic device according to claim 10, comprising a third display disposed in the non-display area of the first display.

14. The electronic device according to claim 10, wherein the information displayed on the second display comprises a notification.

15. The electronic device according to claim 10, wherein the information displayed on the second display comprises directions for input.

16. The electronic device according to claim 10, wherein the processor and the second display are configured to illuminate areas of the second display in sequence to illustrate a gesture.

17. The electronic device according to claim 10, wherein the processor and the second display are configured to display a symbol.

18. The electronic device according to claim 10, wherein the information displayed on the second display comprises directions for input for the electronic device to enter a full-power condition.

19. The electronic device according to claim 10, comprising touch sensors disposed to detect a touch on the display area and to detect a touch on the non-display area of the first touch-sensitive display.

20. The electronic device according to claim 10, wherein, in response to detecting a touch associated with the information displayed on the second display, the electronic device is configured to exit the low-power condition.

21. The electronic device according to claim 10, comprising touch sensors disposed to detect a touch on the display area, wherein the touch sensors disposed in the display area are not utilized for touch sensing when the electronic device is in the low-power condition.

* * * * *